US006816633B1

(12) United States Patent
Kusama et al.

(10) Patent No.: US 6,816,633 B1
(45) Date of Patent: Nov. 9, 2004

(54) IMAGE RETRIEVAL APPARATUS AND METHOD

(75) Inventors: Kiyoshi Kusama, Kawasaki (JP); Kentaro Matsumoto, Higashikurume (JP); Miyuki Enokida, Yokohama (JP); Kunihiro Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 628 days.

(21) Appl. No.: 09/633,153

(22) Filed: Aug. 4, 2000

(30) Foreign Application Priority Data

Aug. 6, 1999 (JP) .......................................... 11-224240

(51) Int. Cl.[7] .............................................. G06K 9/54
(52) U.S. Cl. ...................... 382/305; 382/282; 382/278; 382/209; 382/171; 358/538; 358/520; 358/463
(58) Field of Search ................................ 382/103, 171, 382/190, 209, 251, 275, 217, 218, 219, 252, 269, 278, 282, 286, 287, 291, 293, 294, 295, 305; 358/504, 537, 538, 463, 474, 520

(56) References Cited

U.S. PATENT DOCUMENTS

| | | | | |
|---|---|---|---|---|
| 5,014,330 A | * | 5/1991 | Kobayashi et al. | 382/209 |
| 5,185,809 A | * | 2/1993 | Kennedy et al. | 382/131 |
| 5,229,589 A | * | 7/1993 | Schneider | 235/456 |
| 5,264,838 A | * | 11/1993 | Johnson et al. | 345/611 |
| 5,579,471 A | | 11/1996 | Barber et al. | 395/326 |
| 5,712,474 A | * | 1/1998 | Naneda | 250/208.1 |
| 5,825,922 A | | 10/1998 | Pearson et al. | 382/199 |
| 5,880,858 A | | 3/1999 | Jin | 358/487 |
| 5,893,095 A | | 4/1999 | Jain et al. | 707/6 |
| 6,084,978 A | * | 7/2000 | Taylor et al. | 382/154 |

FOREIGN PATENT DOCUMENTS

| EP | 0 287 113 A2 | 10/1988 | G01T/1/29 |
|---|---|---|---|

OTHER PUBLICATIONS

W. Niblack, "SlideFinder : A Tool For Browsing Presentation Graphics Using Content–Based Retrieval"; Content–Based Access Of Image And Video Libraries, 1999 (Cbaival '99); Proceedings, IEEE Workshop, Fort Collins, CO., USA, Jun. 22, 1999, p. 114–118.

Seyoon Jeong et al., An Effective Method For Combining Multiple Features Of Image Retrieval: Proceedings of IEEE, IEEE Region 10 Conference, Tencon 99, Multimedia Technology For Asia–Pacific Information Infrastructure (CAT. No. 99CH 37030), pp. 982–985 vol. 2,XP010368443 1999 Piscataway, NJ, IEEE, USA, ISBN 0–7803–0573906.

Djeraba C. et al., "Digital Information Retrieval", Proceeding of the 6th Int'l. Conf. on Information And Knowledge Management, CIKM '97, Las Vegas, Nov. 10–14, 1997, pp. 185–192.

Djeraba C. et al., "Retrieve of Images by Content", Intelligence And Systems, 1996., IEEE, Int'l. Joint Symposia On Rockville Md. USA, Nov. 4–5, 1996, Los Alamitos, CA, pp. 261–267.

* cited by examiner

Primary Examiner—Bhavesh M. Mehta
Assistant Examiner—Yosef Kassa
(74) Attorney, Agent, or Firm—Fitzpatrick, Cella, Harper & Scinto

(57) ABSTRACT

In the retrieval of images that resemble a target image from a plurality of images, the image feature quantity of the target image is calculated when the target image is specified. The feature quantity is calculated upon removing an unnecessary area from the specified target image, and retrieval of resembling images is performed using the feature quantity that has been calculated. The unnecessary area is determined automatically based upon a change in luminance in directions vertically and horizontally of the periphery of the target image. Thus, the calculation of feature quantities from which unnecessary portions in an image have been eliminated can be executed with ease and more effective retrieval of resembling images can be carried out.

22 Claims, 9 Drawing Sheets

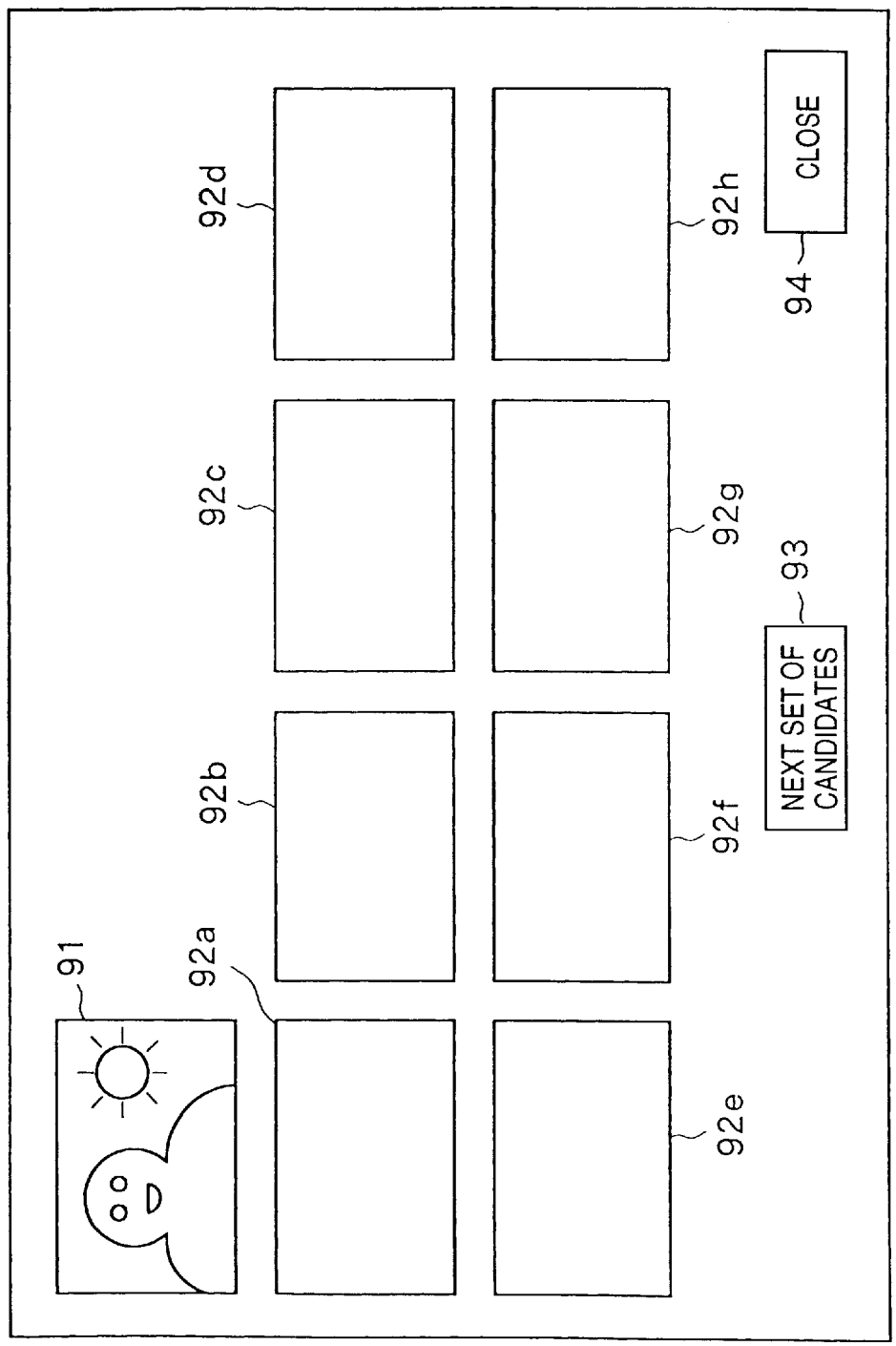

IMAGE RETRIEVAL APPARATUS AND METHOD

FIELD OF THE INVENTION

This invention relates to an image retrieval apparatus and method, e.g., an apparatus and method for retrieving similar images.

BACKGROUND OF THE INVENTION

In a method of retrieving similar images using an image database storing a plurality of images, first a number of images are prepared, the feature quantities of these images are calculated, and the images and their feature quantities are registered together in the image database. Next, a search or target image for which a search is to be conducted is prepared, the feature quantity of this search image is calculated through a method similar to that used when the feature quantities were registered in the image database, an image the feature quantity whereof is nearest that of the calculated feature quantity of the search image is retrieved from the image database and this image is adopted as the similar image.

The technique described above, however, has certain shortcomings.

First, in a case where a search is conducted for images resembling an image that originally had a portion that is unnecessary, such as a black or white border surrounding the image, feature quantities are calculated with regard to the unnecessary border portion as well. As a consequence, the feature quantities of images having the same borders are very similar to the feature quantity of the target image and, hence, even images that are not that similar to the target image except for the presence of the surrounding border are retrieved as similar images.

Second, feature quantities which originally include unnecessary portions as well are calculated and registered in the image database in a manner similar to the case where images are registered in the image database, as a result of which images that actually resemble the target image are not retrieved.

In order to avoid the problems mentioned above, a method that has been proposed involves creating anew an image from which a border unnecessary for feature extraction has been removed from the start, and calculating the feature quantity from the newly created image. However, manipulating the image actually obtained is laborious, the original image must be saved separately and managing these images is extremely troublesome.

SUMMARY OF THE INVENTION

Accordingly, an object of the present invention is to make it possible to easily calculate a feature quantity from which unnecessary portions in an image have been eliminated, thereby making possible the more effective retrieval of similar images.

According to the present invention, the foregoing object is attained by providing an image retrieval method for retrieving images that resemble a specified image from a plurality of images, comprising: a decision step of deciding an unnecessary area in the specified image; a calculation step of calculating a feature quantity upon removing the unnecessary area, which has been decided at the decision step, from the specified image; and a retrieval step of retrieving resembling images from the plurality of images using the feature quantity calculated at the calculation step.

Further, according to the present invention, the foregoing object is attained by providing an image retrieval apparatus for retrieving images that resemble a specified image from a plurality of images, comprising: decision means for deciding an unnecessary area in the specified image; calculation means for calculating a feature quantity upon removing the unnecessary area, which has been decided by the decision means, from the specified image; and retrieval means for retrieving resembling images from the plurality of images using the feature quantity calculated by the calculation means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, an illustrate embodiment of the invention and, together with the description, serve to explain the principles of the invention.

FIG. 9 is a diagram illustrating an example of a control screen displayed on the display unit 103 at step S24 in FIG. 2.

DESCRIPTION OF THE PREFERRED EMBODIMENT

A preferred embodiment of the present invention will now be described in detail in accordance with the accompanying drawings.

Figure 1:
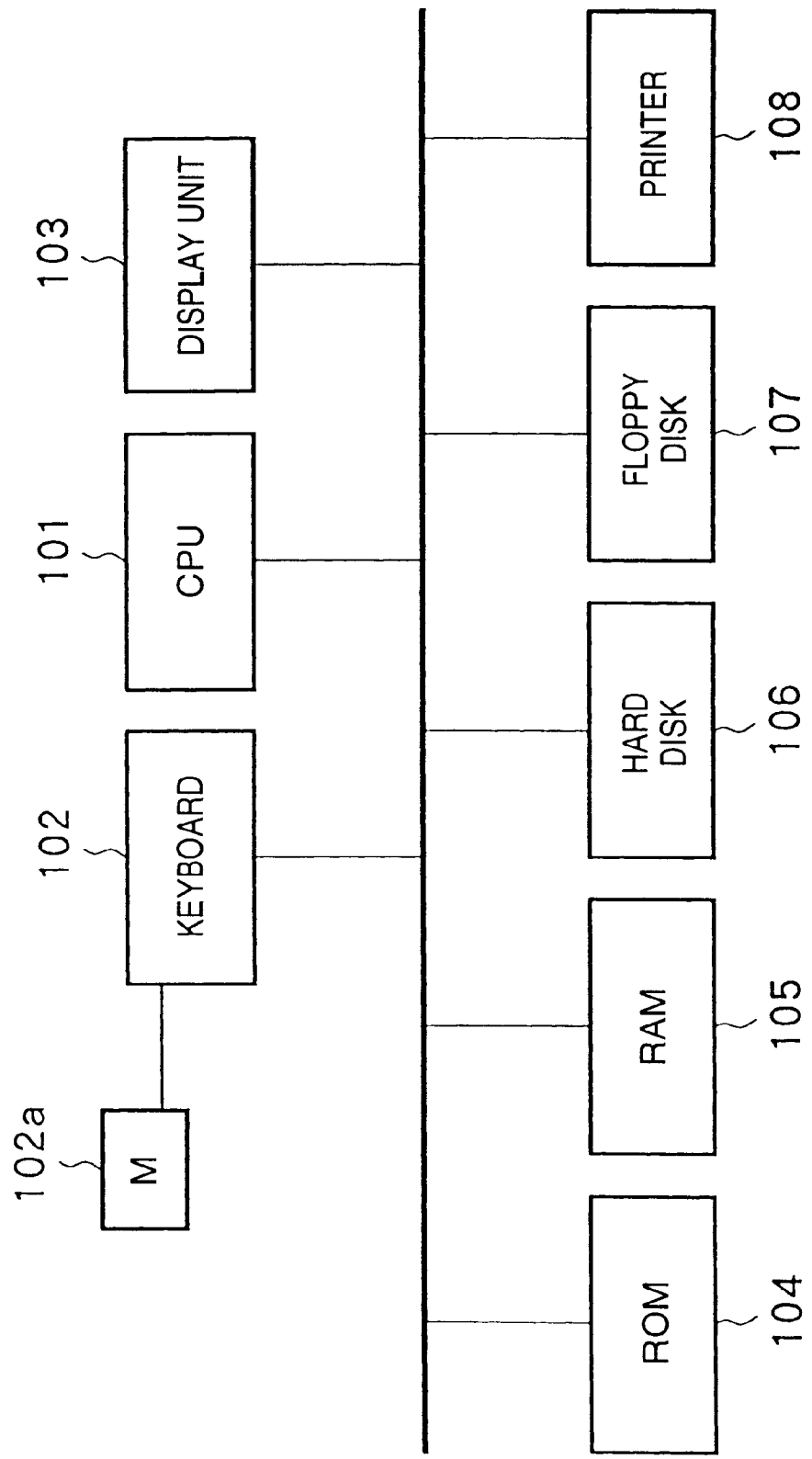
FIG. 1 is a block diagram illustrating the configuration of a computer system for implementing image retrieval processing according to an embodiment of the present invention.

FIG. 1 is a block diagram illustrating the configuration of a computer system (image retrieval apparatus) for implementing image retrieval processing according to this embodiment.

In FIG. 1, a CPU 101 controls the overall system of this embodiment. A keyboard 102 is used together with a mouse 102a to input operating commands to the system. A display unit 103, which is constituted by a CRT or liquid crystal panel, presents various displays under the control of the CPU 101. A ROM 104 and a RAM 105 construct the storage devices of the system and store a control program executed by the CPU 101 and various data utilized by the system. A hard disk 106 and a floppy disk 107 construct external storage devices used as a file system for this system. The system further includes a printer 108.

In the description that follows, image data that is the target of a search is assumed to have been stored in the hard disk 106. However, the target image may be stored in another form. For example, the target image may reside in a database to which the system is connected by the Internet.

Figure 2:
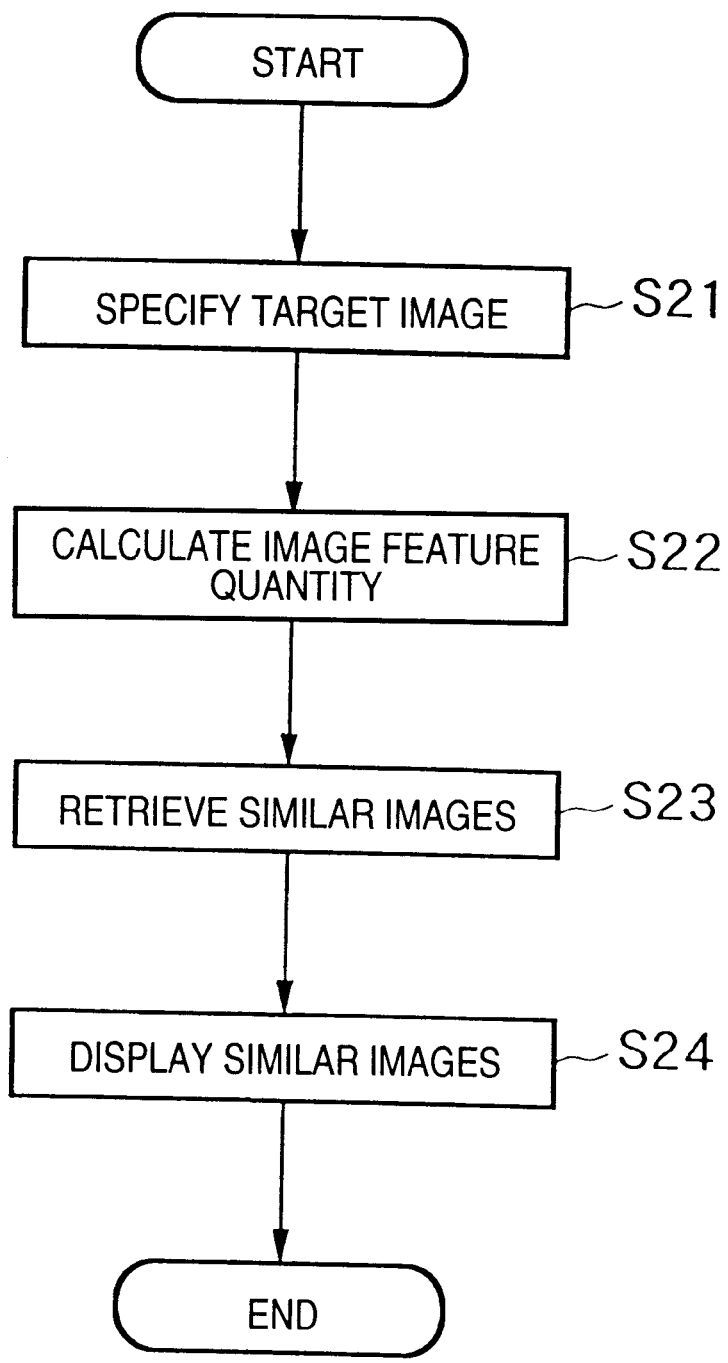
FIG. 2 is a flowchart illustrating the general flow of image retrieval processing according to this embodiment.

FIG. 2 is a flowchart illustrating the general flow of image retrieval processing according to this embodiment.

As shown in FIG. 2, the user specifies a target image, namely an image for which search and retrieval are to be conducted, at step S21. Next, at step S22, the feature quantity of this image is calculated. This is followed by step S23, at which a similar image is retrieved based upon this feature quantity. The similar image obtained by such retrieval is then displayed on the display unit 103 at step S24. The details of these steps will be described below.

<Step S21>

Figure 3:
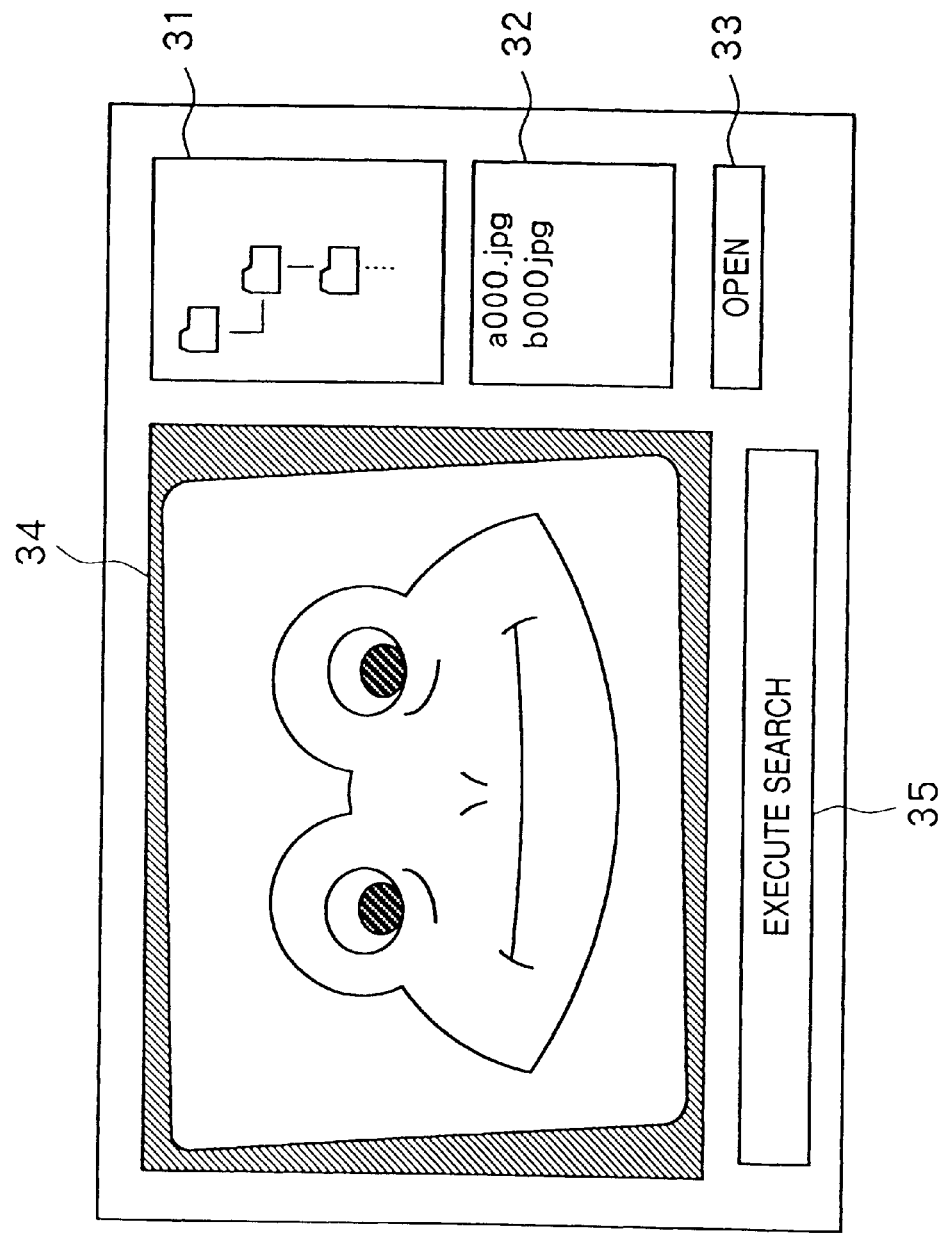
FIG. 3 is a diagram illustrating an example of a control screen displayed on a display unit at a step 24 in the flowchart of FIG. 2.

FIG. 3 is a diagram illustrating an example of a control screen displayed on the display unit 103 at step S21. The screen includes a directory designation section 31, a file designation section 32, an open button 33, an image display area 34 and a search execute button 35.

The operation of software when a search image (target image) is specified is as follows: First, the user designates a directory in the directory designation section 31, designates a file within the designated directory in the file designation section 32 and presses (clicks) the open button 33 to open the image. The image thus opened is displayed in the image display area 34.

Next, if the user wishes to retrieve images similar to the image displayed in the image display area 34, the user presses the search execute button 35. If the button 35 is pressed, step S21 ends and processing proceeds to step S22.

In a case where the opened image displayed in the image display area 34 is not the desired image, the user performs an operation similar to that described above to designate another file and display the image. This operation can be repeated until the desired appears in the image display area 34.

<Step S22>

Figure 4:
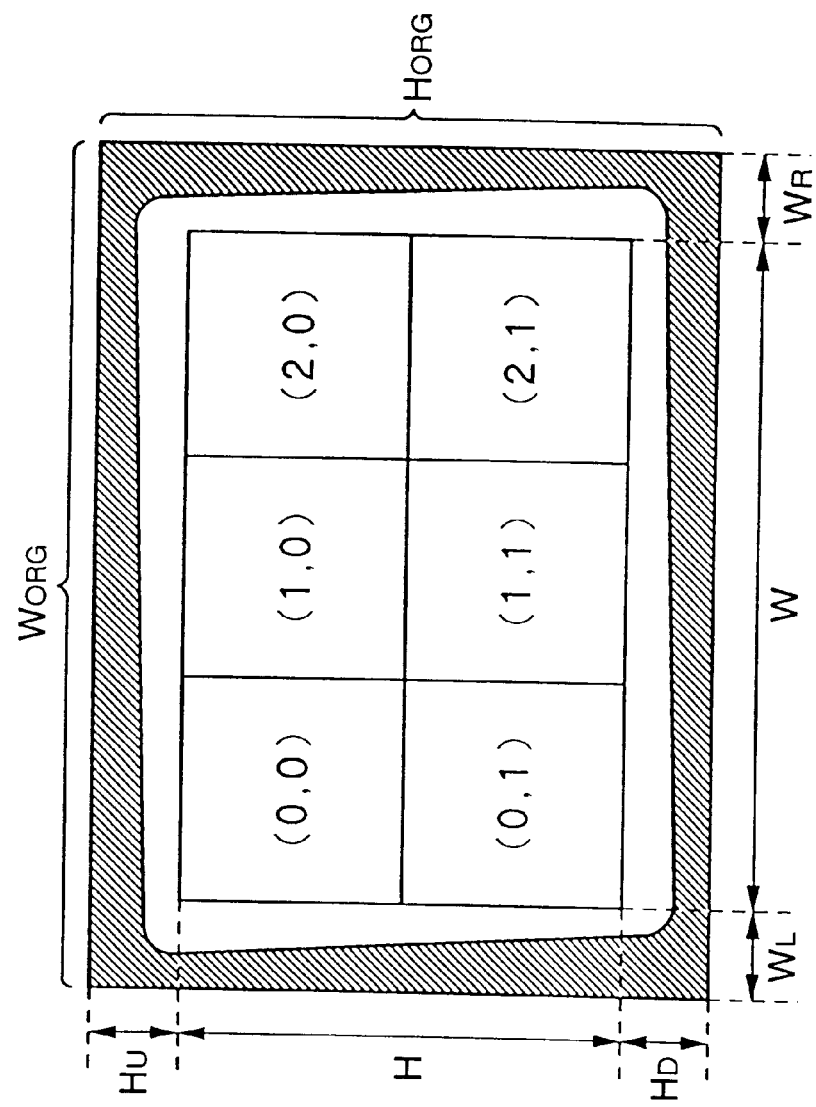
FIG. 4 is a diagram showing the manner in which an unnecessary border is removed.

At this step the feature quantity is calculated upon removing unnecessary portions from the image for which the search is to be conducted. FIG. 4 is a diagram showing the manner in which an unnecessary border portion is removed.

As shown in FIG. 4, the size of the image display area is $W_{ORG}$-number of pixels in the horizontal direction and $W_{ORG}$-number of pixels in the vertical direction. In a case where the target image that is the object of search and retrieval has unnecessary portions on all four sides, the feature quantity of this image is calculated upon removing these unnecessary portions. That is, as shown in FIG. 4, unnecessary numbers of pixels $H_U$, $H_D$, $W_L$ and $W_R$ at the top, bottom, left and right of the target image, respectively, are not adopted as the object of feature-quantity calculation.

The numbers of pixels $H_U$, $H_D$, $W_L$, $W_R$ are decided in the manner described below. First, one of a plurality of images is extracted and portions in which a change in luminance is less than a predetermined threshold value are determined in the horizontal and vertical directions of this image. The numbers of pixels from the edges of these portions found at the top, bottom, right and left of the image are adopted as $H_U$, $H_D$, $W_R$ and $W_L$, respectively.

It should be noted that it does not matter whether $H_U$, $H_D$, $W_L$, $W_R$ are of the same size or of different sizes. That is, the determination of unnecessary portions as mentioned above may be performed for each and every image. Alternatively, an arrangement may be adopted in which the same unnecessary portions are applied to all images, wherein these unnecessary portions are found from a single image extracted initially or arbitrarily.

Further, an arrangement may be adopted in which a border extending lengthwise and breadthwise is displayed in the image display area 34 and is manipulated manually as by a pointing device to specify the unnecessary portions.

By specifying the unnecessary portions in the manner described above, the size of the target image after removal of the unnecessary pixels will be W pixels ($W=W_{ORG}-W_L-W_R$) in the horizontal direction and H pixels ($H=H_{ORG}-H_U-H_D$) in the vertical direction.

In this embodiment, the area of W×H pixels is divided into three areas horizontally and two areas vertically, for a total of six areas, and the areas are denoted by (0,0), (1,0), . . . , (2,1) in order starting from the upper left. The average values of the R, G, B values of each of these areas are calculated, for a total of 18 numerical values, and constitute the feature quantity of the target image.

The flow of processing for calculating the feature quantity mentioned above will be described further with reference to the flowchart of FIG. 5.

Figure 5:
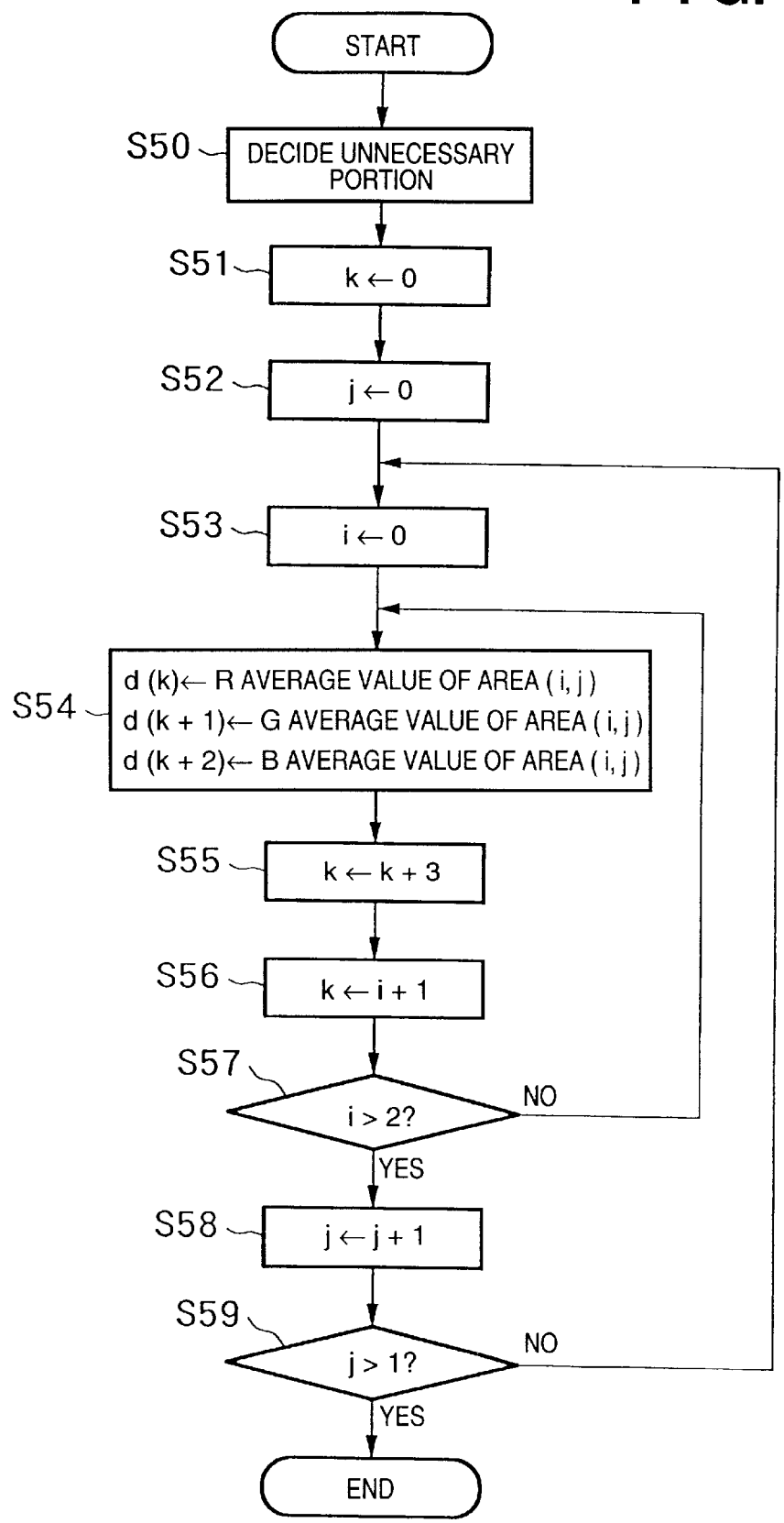
FIG. 5 is a flowchart useful in describing processing for calculating a feature quantity according to this embodiment.

FIG. 5 is a flowchart useful in describing processing for calculating a feature quantity according to this embodiment.

As shown in FIG. 5, unnecessary portions are determined at step S50 in the manner described above. In this embodiment, by way of example, vertical and horizontal lines capable of being moved to the left and right as well as up and down by the user are displayed in the image display area 34 (FIG. 3) and are used to set $H_U$, $H_D$, $W_L$, $W_R$ depicted in FIG. 4.

Next, a variable k is initialized to a value 0 at step S51, a variable j is initialized to a value 0 at step S52 and a variable i is initialized to a value 0 at step S53.

Next, at step S54, the average value of the R values of one area (i,j) in an image represented by image data from which the unnecessary portions that were determined at step S50 have been removed is substituted for the kth element d(k) of an array d. Further, the average value of the G values is substituted for d(k+1) and the average value of the B values is substituted for d(k+2). It should be noted that the method of calculating the average values of the R, G, B values will be described later with reference to the flowchart of FIG. 6.

Next, k is incremented by 3 at step S55 and i is incremented by 1 at step S56. Next, i is compared with the value 2 at step S57 and control proceeds to step S58 if i is greater than 2 or returns to step S54 if it is not. Next, j is incremented by 1 at step S58, the value of j is compared with the value 1 at step S59 and processing is completed if j is greater than 1. If j is not greater than 1, control returns to step S53.

If processing is completed, the feature quantity of the target image is stored in the array d( ), which has 18 elements.

In the example set forth above, the feature quantity is calculated upon dividing the image into six areas, as illustrated in FIG. 4. The variable i and the value 2 are compared at step S57, therefore, and the variable j and value 1 are compared at step S59. However, it is obvious that if the number of divisions of the image is changed, then the above-mentioned values also will change accordingly. In a case where the number of divisions is changed, the number of elements of the feature quantity will not be 18 but will increase or decrease accordingly.

Further, according to this embodiment, the image is divided into six rectangles of equal area, as shown in FIG. 4. However, division into rectangular areas does not impose a limitation upon the invention; the image may be divided into more complicated shapes.

Figure 6:
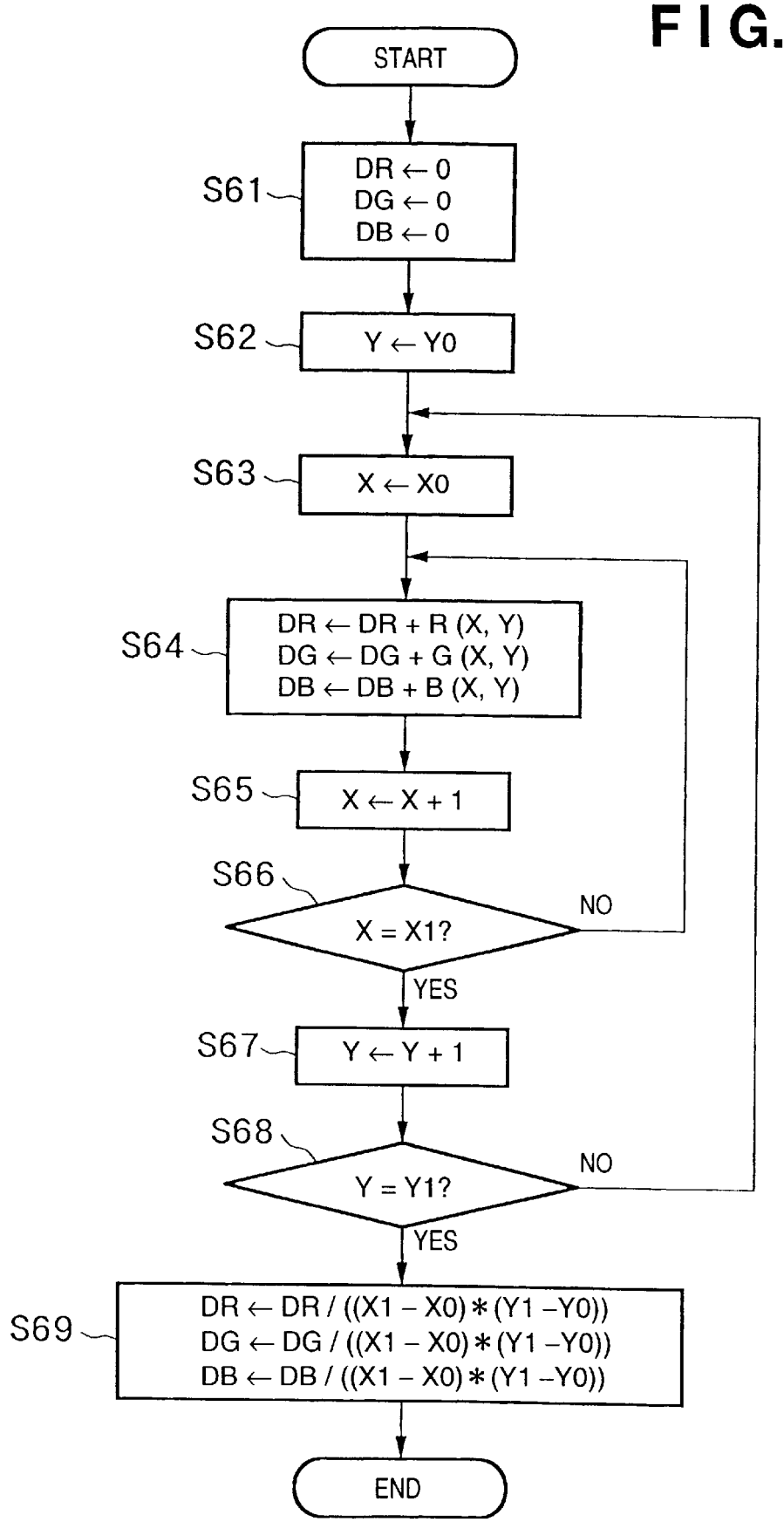
FIG. 6 is a flowchart useful in describing a method of calculating average values of R, G, B values on a per-area basis according to this embodiment.

FIG. 6 is a flowchart useful in describing a method of calculating average values of R, G, B values on a per-area basis according to this embodiment. It is assumed here that the image data has been stored in three arrays R(X,Y), G(X,Y), B(X,Y), where $0 \leq X<W$ and $0 \leq Y<H$ hold and the upper left-hand corner of the image is taken as the origin (0,0). In the flow described below, average density is calculated in a partial area delimited by $X0 \leq X<X1$, $Y0 \leq Y<Y1$ and the average densities of R, G, B are returned to variables DR, DG, DB, respectively.

Since the area corresponding to area (i,j) at step S54 in FIG. 5 corresponds to $X0=W_L+W\times i/3$ $X1=W_L+W\times(i+1)/3$ $Y0=H_U+H\times j/2$ $Y1=H_U+H\times(j+1)/2$ the flowchart shown in FIG. 6 is executed after the constants X0, X1, Y0, Y1 are initialized in the manner described above.

First, the variables DG, DG, DB are initialized to 0 at step S61, the variable Y is initialized to Y0 at step S62, and the variable X is initialized to X0 at step S63. Next, R(X,Y) is added to DR at step S64. Similarly, G(X,Y), B(X,Y) are added to DC and DB, respectively, at step S64.

The variable X is incremented by 1 at step S65 and the variable X and X1 are compared at step S66. Control proceeds to step S67 if they are equal but returns to step S64 if they are not. The variable Y is incremented by 1 at step S67 and the variable Y and Y1 are compared at step S68. Control proceeds to step S69 if they are equal but returns to step S63 if they are not. Thus, the sums of the color values of the respective ones of the color components of all pixels in the area (i,j) are obtained.

Next, at step S69, the variables DR, DG, DB are each divided by the number of pixels in the area [i.e., by (X1−X0)×(Y1−Y0)]. As a result, DR, DG, DB become the average densities obtained by dividing the pixel densities in the area by the number of pixels.

<Step S23>

Retrieval of similar images is performed at steps 23 based upon the image feature quantity described above. It should be noted that image data representing N-number of images has been stored on the hard disk 106, that the feature quantity of each image has been calculated beforehand by a method the same as that described above, and that these feature quantities have been stored. In other words, when the images are stored in a database, the feature quantities are calculated upon removing the unnecessary portions from the images.

Further, the image data may be stored in a standard file format such as the well-known JPEG or BMP format or in a unique format in a so-called RDBMS (Relational Database Management System).

It is assumed that the image feature quantities have been stored in a two-dimensional array D(n,i) having a size of N×18 (where $0 \leq n<N$, $0 \leq i<18$). An image-to-image distance S(n), namely a distance between a submitted image and an nth image, is defined by the following equation:

$$S(n) = \sum_i [D(n, i) - d(i)]^2$$

The smaller the image-to-image distance S(n), the higher the degree of similarity of the image is judged to be. More specifically, according to this embodiment, search and retrieval of similar images is performed by calculating image-to-image distances S(n) ($0 \leq n \leq N$) between the submitted image and all N images, then selecting M (0<M<N) of these distances in order starting from the smaller values of S(n). The procedure through which S(n) is calculated will be described below with reference to the flowchart of FIG. 7, and the procedure through which the M images are selected will be described with reference to the flowchart of FIG. 8.

Figure 7:
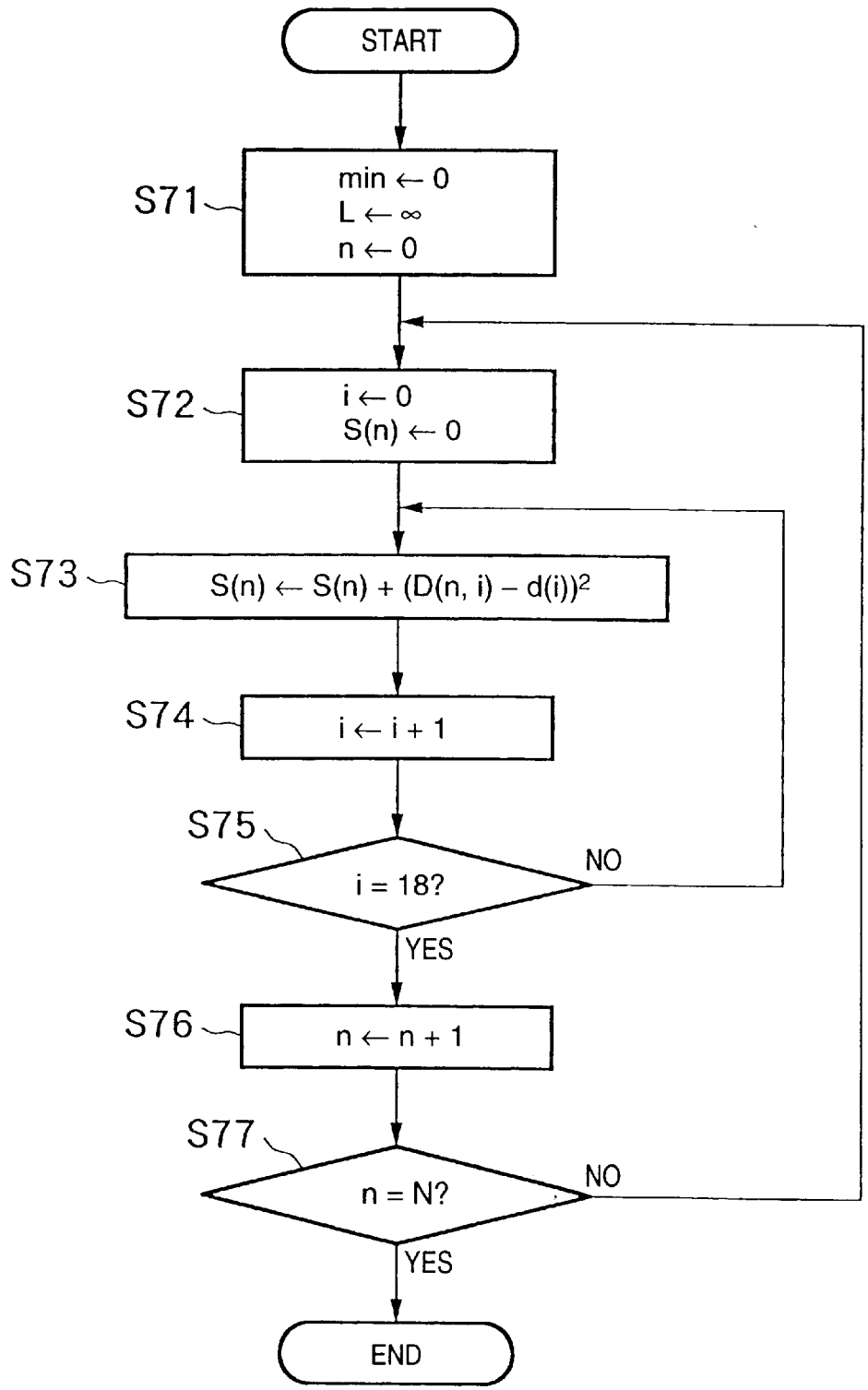
FIG. 7 is a flowchart useful in describing a procedure for calculating the distances between images according to this embodiment.

FIG. 7 is a flowchart useful in describing a procedure for calculating the distances between images according to this embodiment.

In FIG. 7, variables min, n are initialized to the value 0 and L is initialized to a sufficiently large value at step S71, and variables i, S(n) are initialized to the value 0 at step S72.

Next, at step S73, the square of the difference between D(n,i) and d(i) is added to S(n). The variable i is incremented by 1 at step S74 and the variable i and the value 18 are compared at step S75. Control proceeds to step S76 if the two are equal but returns to step S73 if they are not. The variable n is incremented by 1 at step S76 and the variable n and the N are compared at step S77. Processing is ended if the two are equal; otherwise, control returns to step S72.

By virtue of the foregoing processing, the image-to-image distances between the submitted image and all stored images are stored in the array S(n).

Next, processing for selecting M-number of the images in order starting from the smaller image-to-image distances and storing the image numbers thereof in an array T( ) will be described with reference to FIG. 8.

Figure 8:
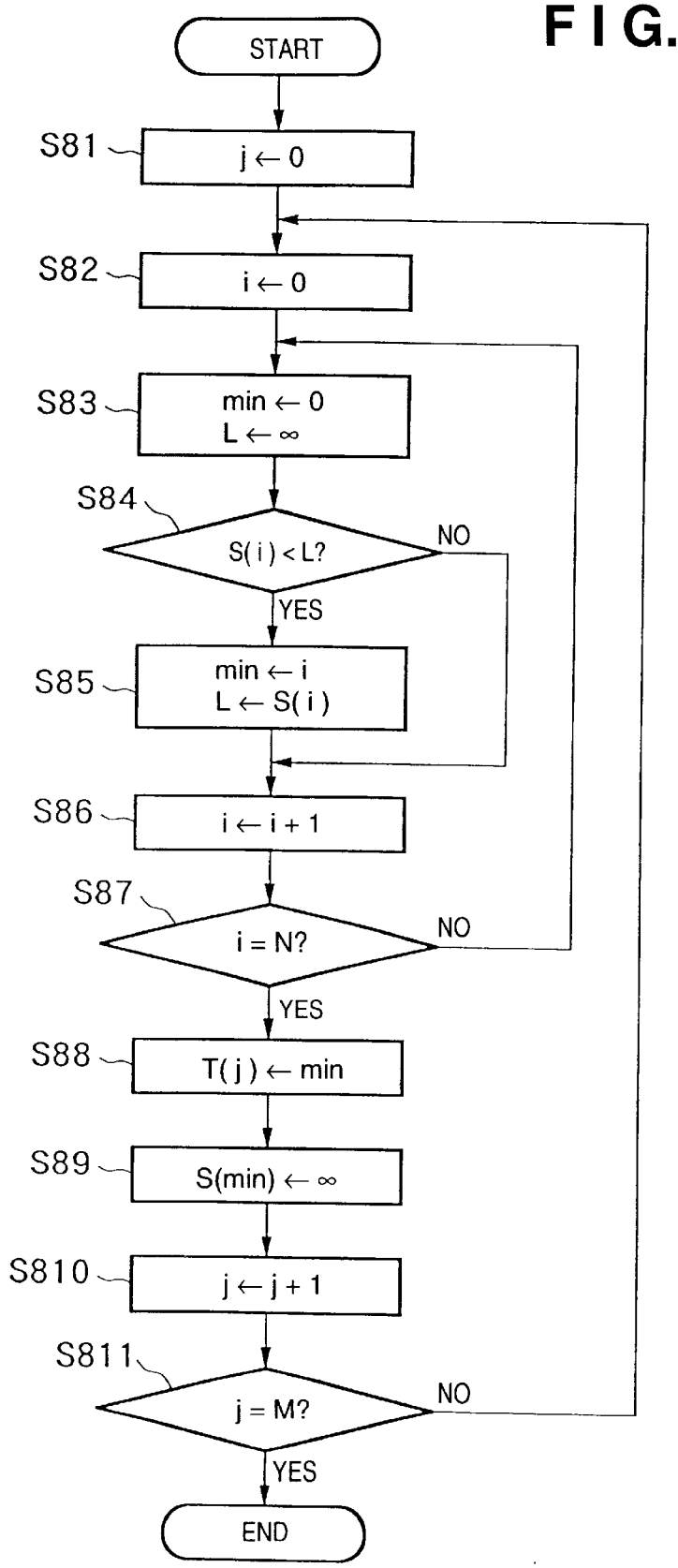
FIG. 8 is a flowchart useful in describing a procedure for selecting a similar image according to this embodiment.

FIG. 8 is a flowchart useful in describing a procedure for selecting similar images according to this embodiment.

In FIG. 8, the variable j is initialized to the value 0 at step S81, the variable i is initialized to the value 0 at step S82, and the variable min is initialized to the value 0 and L is made a sufficiently large value at step S83.

Next, S(i) and L are compared at step S84. Control proceeds to step S85 if S(i)<L holds; otherwise, control returns to step S86. The value i is substituted into the variable min and S(i) is substituted into L at step S85.

Next, i is incremented by 1 at step S86, i and N are compared at step S87, control proceeds to step S88 if they are equal, and control returns to step S83 if they are not equal. The value min is substituted into T(j) at step S88, and the sufficiently large value is substituted into S(min) at step S89. Next, j is incremented by 1 at step S810, j and M are compared at step S811, processing is completed if they are equal, and control returns to step S82 if they are not equal.

By virtue of the procedure described above, image numbers are stored in the array T(j) ($0 \leq j<M$) in decreasing order of similarity to the submitted image.

<Step S24>

FIG. 9 is a diagram illustrating an example of a control screen displayed on the display unit 103 at step S24 in FIG. 2.

As shown in FIG. 9, the submitted target image is displayed in reduced form in an area 91. Similar images retrieved by the above-described processing are displayed in reduced form in areas 92*a* to 92*h*. An image corresponding to image number T(0), which is the number of the image having the highest degree of similarity, is displayed in area 92*a;* an image corresponding to T(1) is displayed in area 92*b;* . . . ; and an image having the lowest degree of similarity among the images 92*a* to 92*h* is displayed in area 92*h*.

The stored image data may be decoded and displayed on the screen in reduced form in the areas 92*a* to 92*h*. If low-resolution icon data for icons, such as data in accordance with the standard image format FlashPix, is available, the icon data may be displayed in the areas 92*a* to 92*h*. If a button 93 is clicked, the next set of candidates, namely images corresponding to T(8) to T(15), is displayed in the areas 92*a* to 92*h* in reduced form. This operation can be repeated up to the image that corresponds to T(M−1). If a button 94 is clicked, step S24 is completed.

Thus, in accordance with this embodiment, as described above, the feature quantity of an image is calculated upon removing unnecessary portions from the image, and use is made of the feature quantity thus obtained. As a result, images are retrieved more effectively.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium (or recording medium) storing the program codes of the software for performing the functions of the foregoing embodiment to a system or an apparatus, reading the program codes with a computer (e.g., a CPU or MPU) of the system or apparatus from the storage medium, and then executing the program codes. In this case, the program codes read from the storage medium implement the novel functions of the embodiment and the storage medium storing the program codes constitutes the invention. Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiment.

In accordance with the present invention, as described above, the calculation of feature quantities from which unnecessary portions in an image have been eliminated can be executed with ease and more effective retrieval of similar images can be carried out.

As many apparently widely different embodiments of the present invention can be made without departing from the spirit and scope thereof, it is to be understood that the invention is not limited to the specific embodiments thereof except as defined in the appended claims.

What is claimed is:

1. An image retrieval method for retrieving images that resemble a specified image from a plurality of images, comprising:

a decision step, of deciding an unnecessary area in the specified image, wherein said decision step includes a detection step, of detecting position and size of the unnecessary area based upon a change in luminance in the vertical and horizontal directions of the periphery of the specified image;

a removal step, of removing the unnecessary area decided in said decision step from the specified image;

a calculation step, of calculating a feature quantity of an image obtained by removing the unnecessary area, decided in said decision step, from the specified image;

a retrieval step, of retrieving images resembling the specified image from the plurality of images using the feature quantity calculated in said calculation step; and a display step, of presenting a display based upon the images resembling the specified image obtained in said retrieval step.

2. A method according to claim 1, wherein the unnecessary area, decided in said decision step, is a portion of the specified image located at the periphery of the specified image.

3. A method according to claim 1, wherein said decision step includes executing said detection step with regard to an image specified at a predetermined timing, holding the result of the detection, and applying the held unnecessary area, decided in said decision step, to subsequent specified images.

4. A method according to claim 1, wherein said decision step includes executing said detection step with regard to the specified image whenever a new specified image is specified.

5. A method according to claim 1, wherein said decision step includes displaying a border in a display of the specified image, the unnecessary area being decided by manually manipulating the border.

6. The method according to claim 1, wherein said calculation step includes dividing the an image, obtained by removing the unnecessary area decided in said decision step from the specified image, into a plurality of blocks and calculates a feature quantity of each block thereby to obtain the feature quantity of the image.

7. A method according to claim 6, wherein said calculation step includes calculating average values of color-component values on a block by block basis to thereby obtain the feature quantity.

8. A method according to claim 1, further comprising a storage step, of storing, in corresponding form, image data representing a plurality of images and feature quantities of the image data representing these images in storage means, wherein the feature quantities stored in the storage means are calculated upon removing unnecessary areas from each of the images.

9. A method according to claim 8, wherein said retrieval step includes obtaining image-to-image distances based upon the feature quantity calculated in said calculation step and the feature quantities that have been stored in the storage means, and extracting resembling images based upon the obtained image-to-image distances.

10. A method according to claim 9, wherein said retrieval step includes extracting, as resembling images, a predetermined number of images in decreasing order of the obtained image-to-image distances.

11. An image retrieval apparatus for retrieving images that resemble a specified image from a plurality of images, comprising:

decision means for deciding an unnecessary area in the specified image, wherein said decision means includes detection means for detecting position and size of the unnecessary area based upon a change in luminance in the vertical and horizontal directions of the periphery of the specified image;

calculation means for calculating a feature quantity of an image obtained by removing the unnecessary area, decided by said decision means, from the specified image;

retrieval means for retrieving images resembling the specified image from the plurality of images using the feature quantity calculated by said calculation means; and display means for presenting a display based upon the images resembling the specified image obtained by said retrieval means.

12. An apparatus according to claim 11, wherein the unnecessary area, decided by said decision means, is a portion of the specified image located at the periphery of the specified image.

13. An apparatus according to claim 11, wherein said decision means causes said detection means to function with regard to an image specified at a predetermined timing, hold the result of the detection, and apply the held unnecessary area, decided by said decision means, to subsequent specified images.

14. An apparatus according to claim 11, wherein said decision means causes said detection means to function with regard to the specified image whenever a new specified image is specified.

15. An apparatus according to claim 11, wherein said decision means displays a border in a display of the specified image, the unnecessary area being decided by manually manipulating the border.

16. An apparatus according to claim 11, wherein said calculation means divides the image, obtained by removing the unnecessary area decided by said decision means from the specified image, into a plurality of blocks and calculates a feature quantity of each block to thereby obtain the feature quantity of the image.

17. An apparatus according to claim 16, wherein said calculation means calculates average values of color-component values on a block by block basis to thereby obtain the feature quantity.

18. An apparatus according to claim 11, further comprising storage means for storing, in corresponding form, image data representing a plurality of images and feature quantities of the image data representing these images, wherein the feature quantities stored in said storage means are calculated upon removing unnecessary areas from each of the images.

19. An apparatus according to claim 18, wherein said retrieval means obtains image-to-image distances based upon the feature quantity calculated by said calculation means and the feature quantities that have been stored in said storage means, and extracts resembling images based upon the obtained image-to-image distances.

20. An apparatus according to claim 19, wherein said retrieval means extracts, as resembling images, a predetermined number of images in decreasing order of the obtained image-to-image distances.

21. A storage medium storing a control program for causing a computer to execute image retrieval processing for retrieving images that resemble a specified image from a plurality of images, said control program having:

code for a decision step, of deciding an unnecessary area in the specified image, wherein said decision step includes a detection step, of detecting position and size of the unnecessary area based upon a change in luminance in the vertical and horizontal directions of the periphery of the specified image;

code for a removal step, of removing the unnecessary area decided in said decision step from the specified image;

code for a calculation step, of calculating a feature quantity of an image obtained by by removing the unnecessary area, decided in said decision step, from the specified image;

code for a retrieval step of retrieving images resembling the specified image from the plurality of images using the feature quantity calculated in said calculation step; and code for a display step, of presenting a display based upon the images resembling the specified image obtained in said retrieval step.

22. An image retrieval apparatus for retrieving images that resemble a specified image from a plurality of images, said apparatus comprising:

a decision unit configured to decide an unnecessary area in the specified image, wherein said decision unit includes a detection unit, configured to detect position and size of the unnecessary area based upon a change in luminance in the vertical and horizontal directions of the periphery of the specified image;

a calculation unit configured to calculate a feature quantity of an image obtained by removing the unnecessary area, decided by said decision unit, from the specified image;

a retrieval unit configured to retrieve image data of images resembling the specified image from the plurality of images using the feature quantity calculated by said calculation unit; and a display unit configured to present a display based upon image data obtained by said retrieval unit.

\* \* \* \* \*